US012633639B2

(12) United States Patent
Chang et al.

(10) Patent No.: US 12,633,639 B2
(45) Date of Patent: May 19, 2026

(54) PLANAR BALUN AND POWER AMPLIFIER USING THE PLANAR BALUN

(71) Applicants: National Tsing Hua University, Hsinchu (TW); National Synchrotron Radiation Research Center, Hsinchu (TW)

(72) Inventors: Tsun-Hsu Chang, Hsinchu (TW); Tsung-Chi Yu, Hsinchu (TW); Cheng-Hsuan Chan, Hsinchu (TW)

(73) Assignees: National Tsing Hua University, Hsinchu (TW); National Synchrotron Radiation Research Center, Hsinchu (TW)

( * ) Notice: Subject to any disclaimer, the term of this patent is extended or adjusted under 35 U.S.C. 154(b) by 155 days.

(21) Appl. No.: 18/616,374

(22) Filed: Mar. 26, 2024

(65) Prior Publication Data

US 2024/0332764 A1 Oct. 3, 2024

(30) Foreign Application Priority Data

Mar. 29, 2023 (TW) ................................ 112112097

(51) Int. Cl.
*H01P 5/10* (2006.01)
*H01P 1/00* (2006.01)

(52) U.S. Cl.
CPC . *H01P 5/10* (2013.01); *H01P 1/00* (2013.01)

(58) Field of Classification Search
CPC .................................... H01P 1/00; H01P 5/10
USPC .................................... 333/25, 26, 238, 246
See application file for complete search history.

(56) References Cited

U.S. PATENT DOCUMENTS

| | | | | |
|---|---|---|---|---|
| 5,006,190 | A | 4/1991 | Earle | |
| 11,228,079 | B1 * | 1/2022 | Yu | H01P 5/10 |
| 2009/0102576 | A1 | 4/2009 | Okabe | |
| 2014/0266443 | A1 | 9/2014 | Ono et al. | |
| 2021/0281236 | A1 * | 9/2021 | Wang | H01P 3/081 |

* cited by examiner

*Primary Examiner* — Jorge L Salazar, Jr.

(57) ABSTRACT

A planar Balun used in solid-state microwave generator and radio frequency component manufacturing includes an upper coupling line, a lower coupling line and a delay line segment. The upper coupling line comprises two coupling line segments connected in series by the delay line segment. The lengths and widths of the two coupling line segments are unequal to each other. The upper coupling line and the lower coupling line are electromagnetically coupled in an up-and-down arrangement to generate a balanced signal, and the balanced signal realizes the push-pull operation of a power amplifier.

7 Claims, 12 Drawing Sheets

| Component | Description | Part number | Manufacturer |
|---|---|---|---|
| MRF13750H | LDMOS Transistor | MRF13750HR5 | NXP |
| C1,C2,C3,C4 | Multi Layer Ceramic Capacitor 18 pF 500V | 100B180FT500XT | ATC |
| C5,C7,C11 | Air Trim Capacitor 1-16 pF | 5451 | JMC |
| C6 | Mica Capacitor 22pF 300V | MIN02-002DC220J-F | CDE |
| C8 | Mica Capacitor 5pF 300V | MIN02-002CC050D-F | CDE |
| C9 | Mica Capacitor 3.3pF 300V | MIN02-002CC3R3D-F | CDE |
| C10 | Mica Capacitor 7pF 300V | MIN02-002CC070D-F | CDE |
| C12,C13,C14, C15,C16,C17 | Multi Layer Ceramic Capacitor 33 pF 500V | 100B330FT500XT | ATC |
| C18,C19,C24, C25 | Ceramic Capacitor 1000 pF 2kV 1206 | 1206B102K202NT | NOVACAP |
| C20,C21 | Aluminum Electrolytic Capacitor 10 uF 60 V | EEEFTH100UAR | Panasonic |
| C22,C23 | Aluminum Electrolytic Capacitor 220 uF 60 V | EEE-FK1J221AV | Panasonic |
| R1,R2 | Metal Oxide Film Resistor 5 kOhm 2 W | RO2W5K00JT | CCO |
| R3,R4 | 1 kOhm SMD resistor 1206 | CR1206F41001G | LIZ |
| R5,R6,R9, R10 | 2 kOhm variable resistor | 3296W-1-202LF | BOURNS |
| R7,R8 | 240 Ohm SMD resistor 1206 | WR12X2400FTL | WALSIN |
| R11,R12 | 22 Ohm SMD resistor 0805 | 0805W8F220JT5E | UniOhm |
| VR1,VR2 | Adjustable Regulator | LM317MKVURG3 | TI |
| B1,B2,B3,B4 | Ferrite Bead 90 OHM | ACSB-02-T | ABRACON |
| B5,B6 | Ferrite Bead 47 OHM | ACSB-03-T | ABRACON |
| L1,L2 | Inner diameter 3mm for 4 rotations | NA | The Inventor |

FIG. 9

PLANAR BALUN AND POWER AMPLIFIER USING THE PLANAR BALUN

CROSS-REFERENCE TO RELATED APPLICATION

This application claims the priority of Taiwanese patent application No. 112112097, filed on Mar. 29, 2023, which is incorporated herewith by reference.

BACKGROUND OF THE INVENTION

1. Field of the Invention

The present invention relates generally to a Balun, and more particularly, to planar Balun applied to the field of solid-state microwave generator and radio frequency element manufacturing and a power amplifier using the planar Balun; the planar Balun of the present invention can be used in various hundred-watt and kilowatt-class push-pull power amplifiers, and the use of the planar Balun of the present invention can greatly reduce the area of the power amplifier and the amount of second harmonics, and improve the flexibility of circuit layout and spectral purity respectively, especially above 915 MHz, the present invention can replace the widely used coaxial Balun and simplify amplifier design; the push-pull power amplifier of the planar Balun applied in the present invention can provide microwave output of hundreds to kilos of watts at 915 MHz or higher frequency, and applied to various phase-controlled microwave heating systems and plasma systems.

2. The Prior Arts

In the era when a single radio frequency (RF) transistor can provide hundred to kilos watts of output, many facilities that originally used microwave tubes, such as klystrons used in superconducting acceleration cavities, have gradually been replaced by solid-state amplifiers and power synthesis system; even the magnetrons in common microwave ovens and plasma systems, under the requirement of precise phase control, have in increasing demand for radio frequency transistors and solid-state power amplifiers, but at present the majority still uses magnetrons.

In the microwave heating technology in recent years, in order to seek further breakthrough, the technical focus is on how to establish a phase-controlled heating system and the core of the entire solid-state power system, that is, the development of radio frequency amplifiers.

Commercially available power amplifiers with higher spectral purity or efficiency generally adopt push-pull operation to reduce the second harmonic and impedance conversion rate. The push-pull operation can be realized through a Balun, and most of the common push-pull operations are realized by using a coaxial Balun, especially in hundreds to kilos of watts of radio frequency amplifiers with a frequency higher than 500 MHz. Balun, no other types of Balun is applied in power amplifier. However, because the coaxial Balun needs to be coaxially cut, the accuracy is difficult to control, so that the characteristics of each Balun will be somewhat different. Moreover, it is time-consuming to solder the entire coaxial coat to the PCB board, which is not productive for mass production of RF power amplifiers. Under such circumstances, it is urgent to develop innovative technology for Balun production to apply to the solid-state microwave generators to achieve the goals of mass production, low construction cost, and low production cost. Therefore, it is an issue to be solved when designing frequency>500 MHz power amplifier.

In the Balun design of U.S. Pat. No. 5,006,190A (Motorola's 1991 patent), the Balun has upper and lower metal layers, and the end of the metal of the input end is grounded. Wherein, the design of the U.S. Pat. No. 5,006,190A does not clearly specify the electrical length range of the Balun metal microstrip, and there is no phase adjustment mechanism (such as, the waveguide wavelength is changed by changing the line width, and then the phase is changed).

U.S. Patent Application No. US 2009/0102576A1 (Design Method of Balun Circuit) discloses "a type of microstrip Balun, which includes an upper coupling line, a lower coupling line and a delay line" (instructions No. [0029]-paragraph, FIG. 1).

U.S. Patent Application No. US 2014/0266443A1 (a high-frequency and wide-band amplifier) discloses "a push-pull power amplifier, including two sets of Baluns, which are respectively arranged at the input and output ends of the amplifier, and distributed in a rotationally symmetrical manner; two sets of common source transistors and DC blockers are respectively placed after the Balun balance interface; two sets of matching circuits are respectively set at the input and output ends of the amplifier, and the two sets of matching circuits include a plurality of microstrip transmission lines and a plurality of radio frequency capacitors, and the plurality of microstrip transmission lines are arranged alternately with the plurality of radio frequency capacitors" (paragraphs [0013]-[0017] of the specification, FIG. 1).

As far as the conventional technology is concerned, the issue is how to avoid the characteristics of each Balun to be different without using a coaxial Balun, and it is not conducive for the mass production of RF power amplifiers. It is imperative to develop a Balun with innovative technology, and applied to solid-state microwave generators, to achieve the goals of mass production, low construction cost, and low production cost, and how to decide to abandon this type of Balun when designing a power amplifier with a frequency>500 MHz. For the microwave heating technology, how to establish a phase-controlled heating system, and focus on the core of the entire solid-state power system, i.e., the development of radio frequency amplifiers. It is basically difficult to achieve a perfect differential output when the width of the two does not change. This problem will be more severe at higher frequencies. The design of U.S. Pat. No. 5,006,190A does not clearly specify the range of electrical length associated with the Balun metal microstrip line, nor does it have a phase adjustment mechanism (such as, how to change the waveguide wavelength by changing the line width, and then change the phase), the configuration is completely different. For the microwave heating technology, how to establish a phase-controlled heating system, and focus on the core of the entire solid-state power system, i.e., the development of radio frequency amplifiers. The above descriptions are all unresolved issues.

SUMMARY OF THE INVENTION

A primary objective of the present invention is to provide a planar Balun and a power amplifier using the planar Balun, which is applied in the environment of solid-state microwave generator and the field of radio frequency element manufacturing. The planar Balun generates a balanced signal by using a first metal and a second metal electromagnetically coupled in an up-and-down arrangement, and the balanced signal realizes the push-pull operation of the power amplifier. The tail end of the first metal is grounded, so that the electrical length required by the planar Balun is reduced to below quarter wavelength; through the impedance gradient, the balance of the balanced end is greatly improved. The planar Balun of the present invention can be applied to a 915 MHz or higher frequency with 100 watts to kilowatts microwave output. The power amplifier using the planar Balun comprises a transistor, an input matching circuit, and an output matching circuit, and bias circuit. In practical applications, such as, a push-pull power amplifier having a transistor, an input matching network, an output matching network, a DC blocker, a Balun, a DC filter circuit, a drain bias circuit, and a gate bias circuit, or the power amplifier using the planar Balun having a Balun, an input matching network, an output matching network, a DC filter circuit, a DC bias circuit, a circulator, an input coupler, an output coupler, and a current temperature monitoring circuit, the power amplifier using the planar Balun can be applied to various phase-controlled microwave heating systems and plasma processing systems. The planar Balun of the present invention can be used in various hundred-watt and thousand-watts push-pull power amplifiers, which can greatly reduce the area of the power amplifier and the amount of secondary harmonics, and improve the flexibility of circuit layout and spectral purity, especially at high frequencies, such as, 915 MHz or higher, to replace the widely used coaxial Balun and simplify amplifier design.

Another objective of the present invention is to provide a planar Balun and a power amplifier using the planar Balun, which can be applied in the environment of solid-state microwave generators and the field of radio frequency element manufacturing, while without using a coaxial Balun, the differences in the characteristics of each Balun can be avoided, applicable to solid-state microwave generators to achieve the goals of mass production, low construction costs, and low production costs, used for frequencies>500 MHz, to focus on the core of the entire solid-state power system, i.e., the development of radio frequency amplifiers, and can produce 915 MHz solid-state power amplifiers, which can be used in, such as, material processing systems, e.g., carbon fiber or biodiesel, various plasma systems, and so on.

Another objective of the present invention is to provide a planar Balun and a power amplifier using the planar Balun, which is applied in the environment of solid-state microwave generators and the field of radio frequency element manufacturing. The present invention modifies the design principle of the Balun, proposes a Balun that can adjust the phase and amplitude balance arbitrarily, and successfully applies the Balun to a 915 MHz 700 W push-pull radio frequency power amplifier. The present invention is focused on the balance adjustment, and the phase difference and amplitude difference are precisely adjusted by changing the thickness and length of the coupling line at the balanced end.

Another object of the present invention is to provide a planar Balun and a power amplifier using the planar Balun, which is applied in the environment of solid-state microwave generators and the field of radio frequency element manufacturing, and can solve the design problem of U.S. Pat. No. 506,190A in which the disclosure does not clearly specify the electrical length range of the Balun metal microstrip line and does not have a phase adjustment mechanism. However, the present invention limits the length to within a quarter of the wavelength and has a phase adjustment mechanism to change waveguide wavelength by changing line width, thereby changing the phase. The configuration of the present invention is also completely different from the U.S. Pat. No. 506,190A. Moreover, the present invention can achieve a quarter wavelength or less for the overall Balun electrical length by changing the line width of the stripline, which is not simply limited to a quarter wavelength for the Balun electrical length. The present invention aims to improve the limitation of the layout of the Balun and expand the application frequency in radio frequency power amplifiers. The present invention uses a different principle from the previous patents and is objectively novel and progressive. In summary, no matter from principle, configuration or implementation methodology, the present invention is novel and progressive to meet the requirement of patentability. The feature of the present invention can adjust the balance degree by changing the width and length of the coupling line at the balanced end to accurately adjust phase difference and amplitude difference.

In order to achieve the aforementioned objectives, the present invention provides a planar Balun and a power amplifier using the planar Balun, which are applied in the environment of solid-state microwave generator and radio frequency component manufacturing field.

The planar Balun uses a first metal and a second metal disposed in an up-and-down arrangement for electromagnetic coupling to generate a balanced signal, and the balanced signal realizes the push-pull operation of a power amplifier; the first metal is grounded at the tail, so that the required electrical length of the planar Balun is reduced to less than a quarter wavelength, and the balance at the balanced end is greatly improved through the impedance gradient method. The planar Balun of the present invention can be applied in a hundred-watt to kilowatts output amplifier with a frequency of 915 MHz or higher.

The power amplifier using this planar Balun comprises a transistor, an input matching circuit, an output matching circuit and a bias circuit. In practical applications, for example, a push-pull power amplifier comprises a transistor, an input matching network, an output matching network, a DC blocker, Balun, a DC filter circuit, a drain bias circuit, and a gate bias circuit; alternatively, the power amplifier using this planar Balun comprises a Balun, an input matching network, an output matching network, a DC filter circuit, a DC bias circuit, a circulator, an input coupler, an output coupler, and a current temperature monitoring circuit. The power amplifier using this planar Balun can be applied to various phase-controlled microwave heating system and plasma treatment system.

BRIEF DESCRIPTION OF THE DRAWINGS

The present invention will be apparent to those skilled in the art by reading the following detailed description of a preferred embodiment thereof, with reference to the attached drawings, in which:

FIG. 9 is a table showing selectable device specifications of the embodiment illustrated in FIG. 8 during actual implementation.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
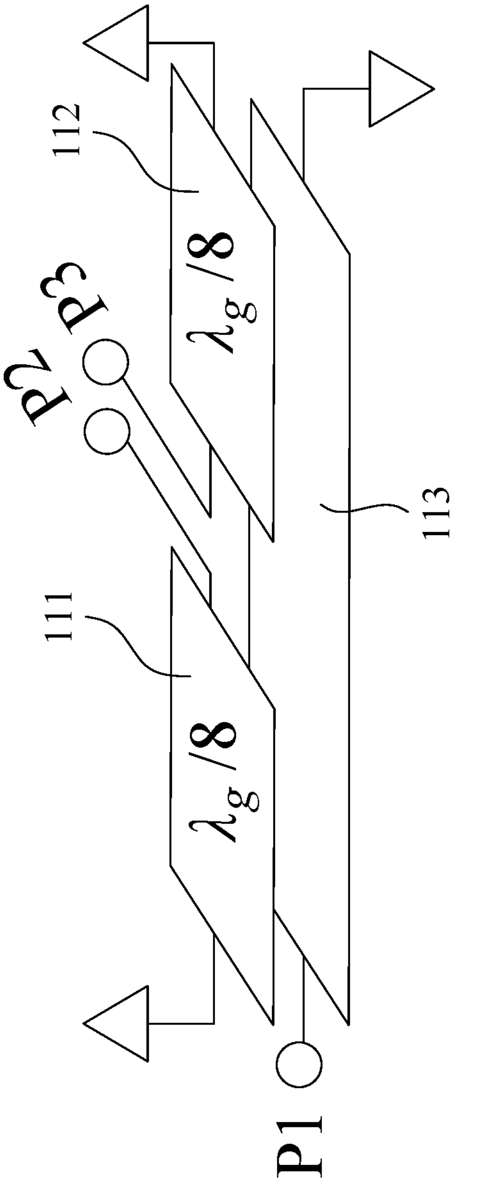
FIG. 1 is a schematic view illustrating the structure and the operation of the planar Balun of the present invention and a power amplifier using the planar Balun.

FIG. 1 is a schematic view illustrating the structure and the operation of a planar Balun of the present invention and a power amplifier using the planar Balun.

As shown in FIG. 1, the upper-and-lower type of coupling (i.e., broadside coupled) mode is selected instead of lateral coupling. By connecting the open circuit end into a short circuit end, the originally required $\lambda_s/4$ length can be reduced to $\lambda_s/8$ or even $\lambda_s/16$, significantly reducing the area of the Balun.

The planar Balun 1 uses a first metal 111, 112 and a second metal 113 disposed in an up-and-down arrangement for electromagnetic coupling to generate a balanced signal, and the balanced signal realizes the push-pull operation of a power amplifier; the first metal 111, 112 is grounded at the tail, so that the required electrical length of the planar Balun 1 is reduced to less than a quarter wavelength, and the balance at the balanced end is greatly improved through the impedance gradient method. The planar Balun 1 may be, for example, a microstrip Balun.

P1 (port 1) is an unbalanced terminal, and P2 (port 2) and P3 (port 3) are two output ports of a balanced terminal.

Figure 2:
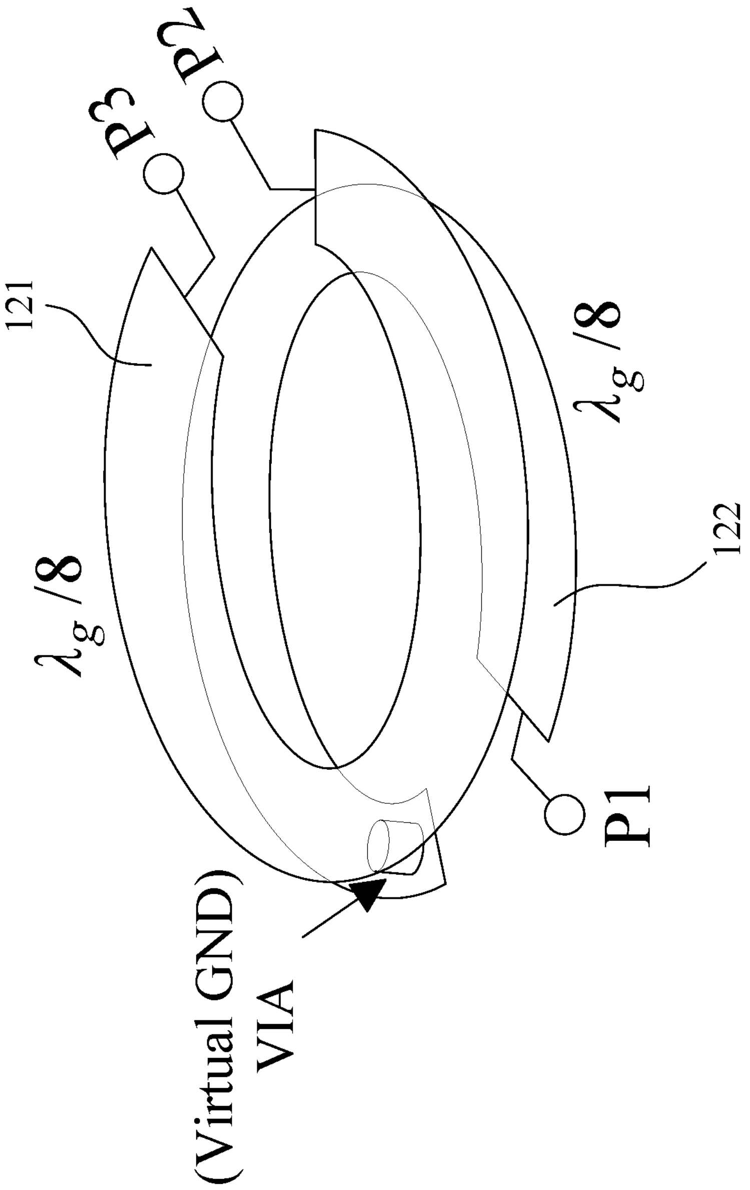
FIG. 2 is a schematic view illustrating the structure and the operation of the planar Balun of the present invention and a power amplifier using the planar Balun, which folds three grounding terminals.

FIG. 2 is a schematic view illustrating the structure and the operation of a planar Balun of the present invention and a planar Balun of a power amplifier using the planar Balun, which folds three grounding terminals. As shown in FIG. 2, it is a schematic view of a reduced version of the broadside coupled Marchand Balun, and the three ground terminals are folded to further reduce the length of the Balun.

The planar Balun 2 uses a first metal 121 and a second metal 122 disposed in an up-and-down arrangement for electromagnetic coupling to generate a balanced signal, and the balanced signal realizes the push-pull operation of a power amplifier so that the required electrical length of the planar Balun 2 is reduced to less than a quarter wavelength, and the balance at the balanced end is greatly improved through the impedance gradient method. The planar Balun 2 may be, for example, a microstrip Balun.

P1 (port 1) is an unbalanced terminal, and P2 (port 2) and P3 (port 3) are two output ports of a balanced terminal.

Figure 3:
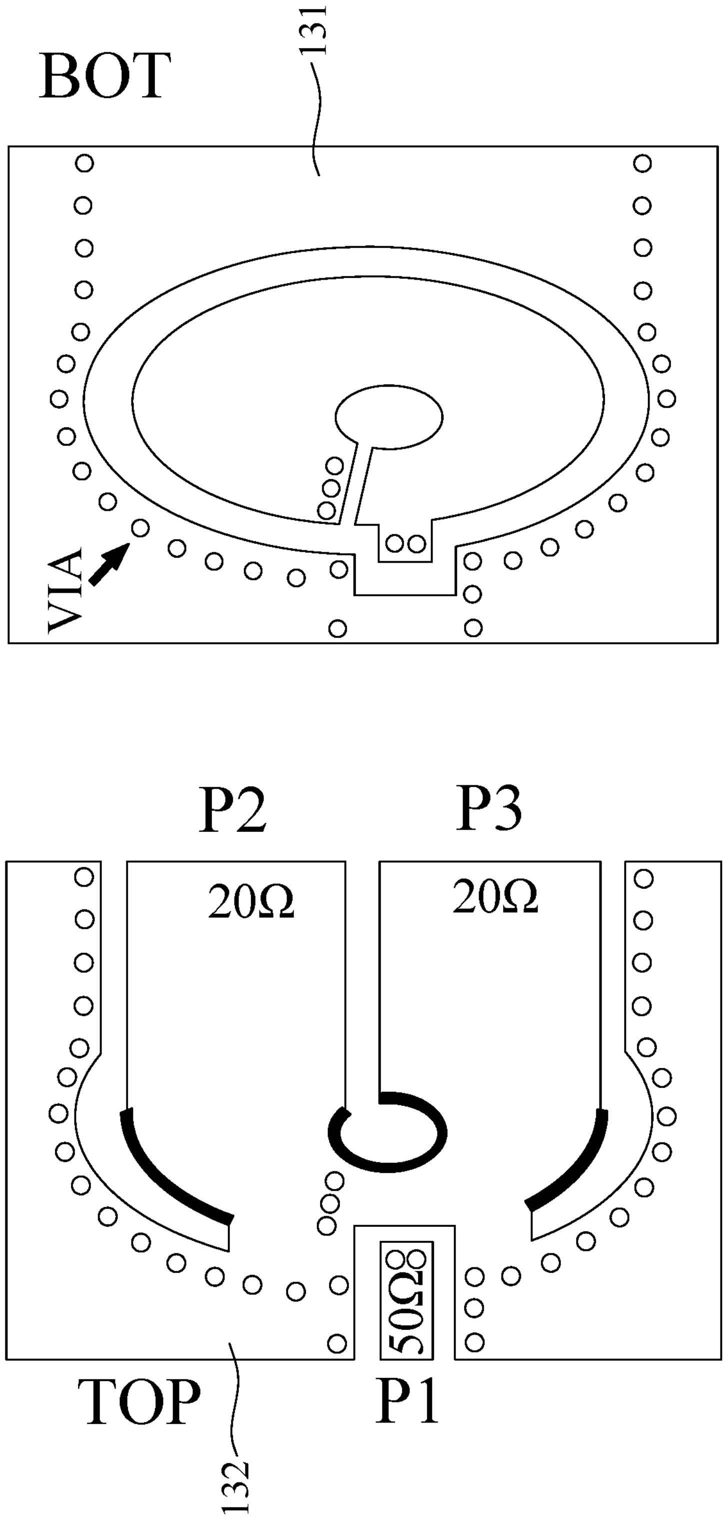
FIG. 3 is a schematic viewing illustrating the structure and operation of the planar Balun of the present invention and a power amplifier using the planar Balun, which is a scaled-down version of the Marchand Balun.

FIG. 3 is a schematic view illustrating the structure and operation of a planar Balun of the present invention and planar Baluns of a power amplifier using the planar Balun, which is a reduced version of the Marchand Balun.

The planar Balun 3 uses a first metal 131 of the BOT and a second metal 132 of the TOP disposed in an up-and-down arrangement for electromagnetic coupling to generate a balanced signal, and the balanced signal realizes the push-pull operation of a power amplifier. The planar Balun 3 may be, for example, be a microstrip Balun.

P1 (port 1) is an unbalanced terminal, and P2 (port 2) and P3 (port 3) are two output ports of a balanced terminal.

The planar Balun 3, for example, can convert a 50-ohm input signal near 915 MHz into a differential signal of 40 ohms (each single output end 20 ohms). The impedance of the differential pair can be adjusted according to practical application.

Since the current of the Balun at the output end of the amplifier is very high, if the transmission line width is too narrow, the surface current density may increase and the transmission line will be overheated. If the substrate is too close, the electric field in the material may be too strong and cause the material to collapse. How to balance size and substrate temperature is an important issue.

P1 (port 1) is an unbalanced terminal, and the impedance value can be, for example, 50 ohms; P2 (port 2) and P3 (port 3) are two output ports of the balanced terminal, and the impedance can be designed to be, for example, an impedance of 20 ohms at single end (use port renormalization to replace 50 with 20). The results show that when the frequency of the planar Balun 1 is 915 MHz, the unbalanced end return loss is 16.45 dB, the penetration coefficient of the two output ports is 3.17 dB, the output port phase difference is 176.45 degrees, and the overall material loss energy is 1.4%, and such a energy loss rate is acceptable.

Whether the return loss of the unbalanced end of the Balun is completely related to the differential mode conversion of the balanced end, when the length of the transmission line at the output end (balanced end) is longer, the common mode and evanescent mode are gradually suppressed, and the more complete the conversion of the differential mode, the lower the input return loss of the Balun. However, due to size considerations, it is impossible to increase the length of the Balun balance port indefinitely. Considering that the Balun matching problem can actually be transferred to the amplifier input matching circuit, the design can only adjust the length to an acceptable value for the input return loss.

The balance between the amplitude and phase of the Balun can be adjusted by changing the length difference of the outer ring of the Balun, the rotation angle, and the horizontal and vertical displacement of the central ellipse hollow area. The closer the elliptical hollow area is to the input end, the easier it is to balance the phase and amplitude of the output end, but it will make the impedance conversion of the Balun too severe, the surface current density will increase, and the temperature will be too high at high power. A part of the phase balance of the balanced port can be sacrificed, so that the penetration value of the balanced port should remain the same as much as possible while maintaining a low surface current density.

Figure 4:
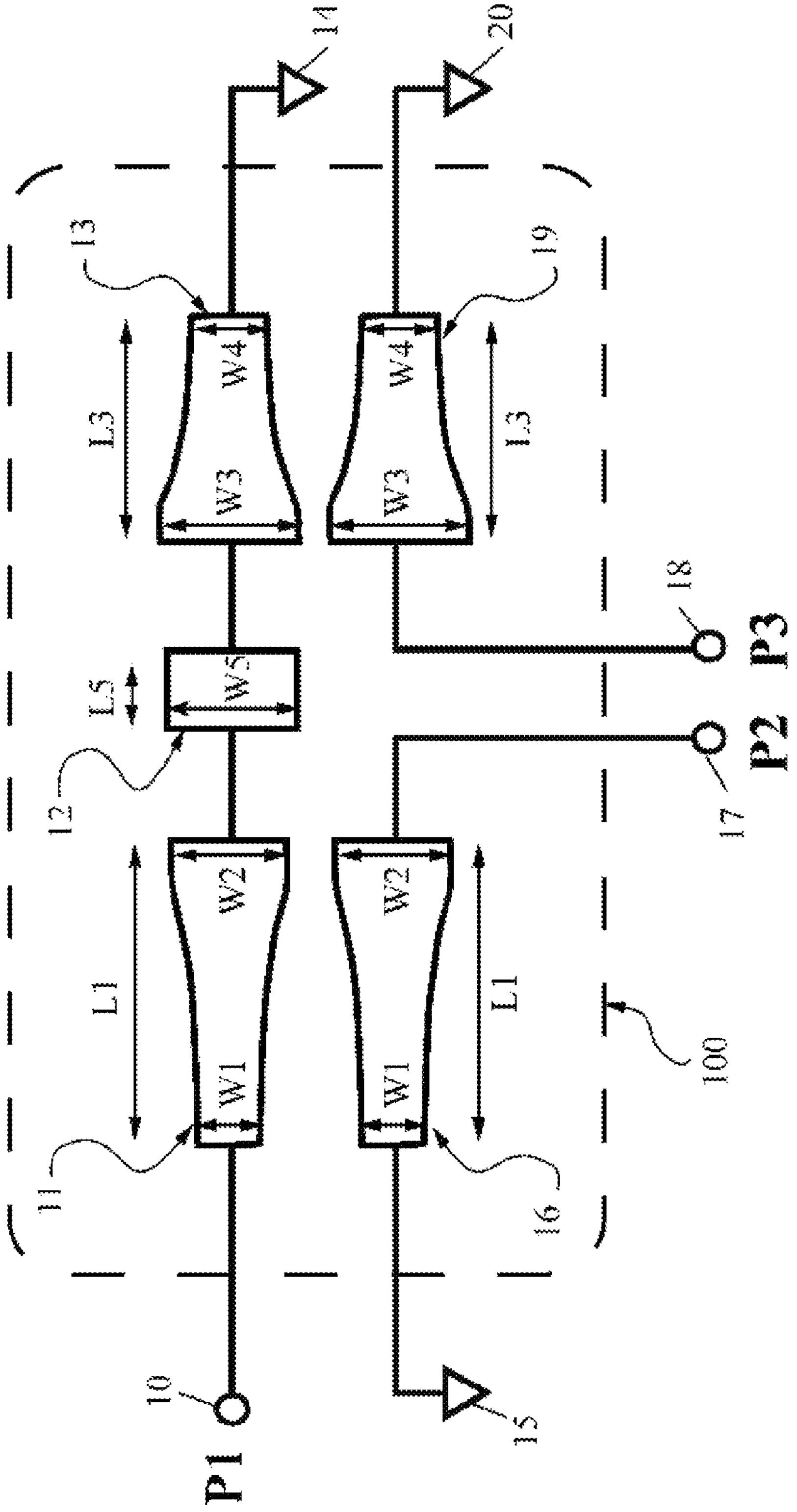
FIG. 4 is a schematic viewing illustrating the structure and operation of an embodiment of a planar Balun and a power amplifier using the planar Balun of the present invention.

FIG. 4 is a schematic view illustrating the structure and operation of an embodiment of a planar Balun and a power amplifier using the planar Balun of the present invention.

As shown in FIG. 4, a planar Balun 100 is a microstrip Balun comprises two upper-and-lower coupling line segments of the first metal and the second metal and a delay line segment. Terminal 10, lines 11, 12, 13, and terminal 14 are in the first metal of the lower conductor layer, and terminal 15, lines 16, 17, 18, 19, and terminal 20 are in the upper conductor layer. Terminal 10 is a Balun input terminal, the port impedance is 50 ohms, lines 17, 18 are Balun balanced output terminals, and the port impedances of lines 17, 18 are less than or equal to 25 ohms. Terminals 14, 15, 20 are ground terminals. Lines 11, 13, 16, 19 are metal striplines with asymptotic changes in impedance, in which W1 (W3) and W2 (W4) are basically not equal in width, that is, the width of one end of the coupling line will be the largest. Depending on application, it is also possible to let the widest point fall in the middle of the coupling line and have the same width on both sides. The lengths L1, L3 of the striplines can be equal or unequal, both of L1 and L3 are less than or equal to one-eighth of the wavelength, and the sum thereof is less than or equal to one-quarter of the wavelength. The widths W2, W3 of the striplines can be different. Line 12 is a delay line segment with the width between W2 and W3, and the length can be changed as needed, and the shorter the better.

In order to improve the phase balance of the output terminal of the Balun, the width and length of the two coupling line segments of the first metal and the second metal are changed to compensate the balance. When changing the coupling line lengths L1 and L3 of the first metal to become unequal, a phase change will naturally occur. In addition, by changing the widths W2 and W3 of the coupling lines at the two balanced ports, the waveguide wavelengths of the coupling lines at both ends are different, which can also cause phase changes; and the different port widths will also affect the impedance value of the microstrip line, resulting in changes in the coupling value. Accordingly, the amplitude of the balanced terminal voltage will also change.

As far as the prior art is concerned, none has disclosed that the technique of changing the wavelength of the waveguide by changing the width can be used to adjust the balance of the Marchand Balun. These two adjustment methods enable the Balun to adjust the amplitude and phase balance of the balanced end arbitrarily for various layout constraints, and the circuit layout will no longer be limited in order to achieve the quarter-wavelength condition.

In order to make the Balun more broadband, smaller in size or easier to adjust the balance, the impedance of the microstrip line is gradually changed, that is, the width no longer remains constant along the transmission direction, but gradually increased or decreased. Under normal implementation conditions, widths W2 and W3 can be made larger than widths W4 and W1 respectively; however, in some special designs, widths W1 and W4 can be made larger than widths W2 and W3 respectively, or the place with the largest width can fall between widths W1 and W4.

After such a design, the total length of the Balun (L1+L5+L3) may be smaller than a quarter wavelength. The lengths L1 and L3 are generally close to one-eighth of the wavelength, but through the present design, they can be smaller than one-eighth of the wavelength. Compared with the previous U.S. Pat. No. 1,726,789, the present method has greater design flexibility, especially in the case where the high frequency area is sensitive to size, the present method can effectively compensate for the balance.

In other words, for the planar Balun of the present invention, the planar Balun can be a microstrip Balun, and the planar Balun of the microstrip Balun includes an upper coupling line, a lower coupling line and a delay line segment. The lengths and widths of the two coupling line segments included in the upper coupling line are not equal to each other, the lengths and widths of the two coupling line segments included in the lower coupling line are not equal to each other, and the lower coupling line is connected in series by an uncoupled delay line. The upper coupling line and the lower coupling line are electromagnetically coupled in an up-and-down arrangement to generate a balanced signal, and the push-pull operation of the power amplifier is realized by the balanced signal. The widths of the two coupling line segments included in the upper coupling line can gradually increase or decrease, and the widths of the two coupling line segments included in the lower coupling line can gradually increase or decrease. The ends of the two coupling line segments with progressive impedance change characteristics included in the upper coupling line are connected to each other, and the ends are connected to the common radio frequency ground through the via holes; the other ends of the two coupling line segments with progressive impedance change characteristics included in the upper coupling line are connect to balanced output. In the lower coupling line, two coupling line segments with the characteristic of gradual change in impedance can be connected through a delay line. One end of the metal segment formed by the coupling line segment in the lower coupling line is connected to the common radio frequency ground through the via hole, and the other end is connected to the unbalanced input end.

Figure 5:
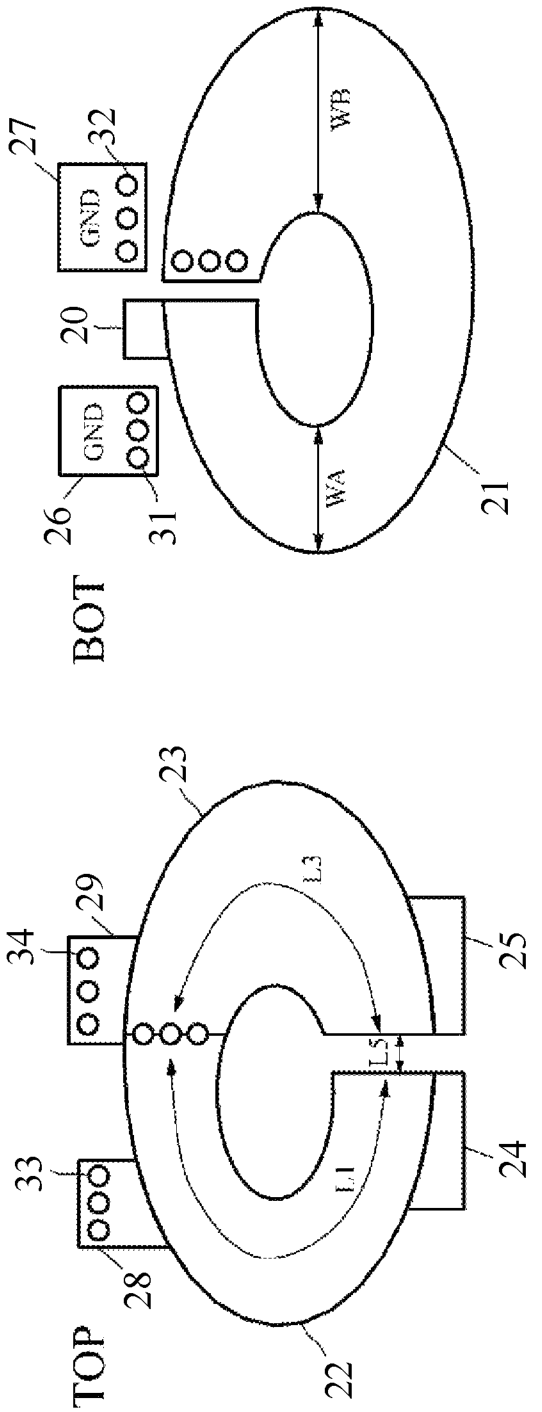
FIG. 5 is a schematic view illustrating the structure and operation of another embodiment of a planar Balun and a power amplifier using the planar Balun of the present invention.

FIG. 5 is a schematic view illustrating the structure and operation of another embodiment of a planar Balun and a power amplifier using the planar Balun of the present invention. The planar Balun can be, for example, a microstrip Balun.

In the actual implementation process, the GND ground plane and the ground holes 26, 27, 28, 29, 31, 32, 33, 34 are also very critical for the influence of the overall characteristics. Therefore, the layout shown in FIG. 5 is also the technical feature of the present invention. The plane shown in FIG. 5 is located on the conductor layers on both sides of the double-sided PCB. Terminal 20 is an unbalanced end, and terminals 24, 25 are balanced ends. Coupling line 21, which is an unbalanced coupling line with gradual change in impedance, is connected with the terminal 20. Coupling lines 22, 23 are two balanced-end coupling lines with gradual impedance changes, the ends of which are connected to each other and connected to terminals 24, 25 respectively. By making lengths L1, L3 unequal, or changing widths WA, WB to cause a width difference, the balance of the output port can be adjusted. The ends of coupling lines 21, 22, 23 are connected to a common radio frequency ground through a via hole 33 (VIA). Via holes 28, 29 are connected to coupling lines 22, 23, and via holes 33 (31), 34 (32) are connected to via holes 28, 29 to the ground of the lower conductor layer.

Figure 6:
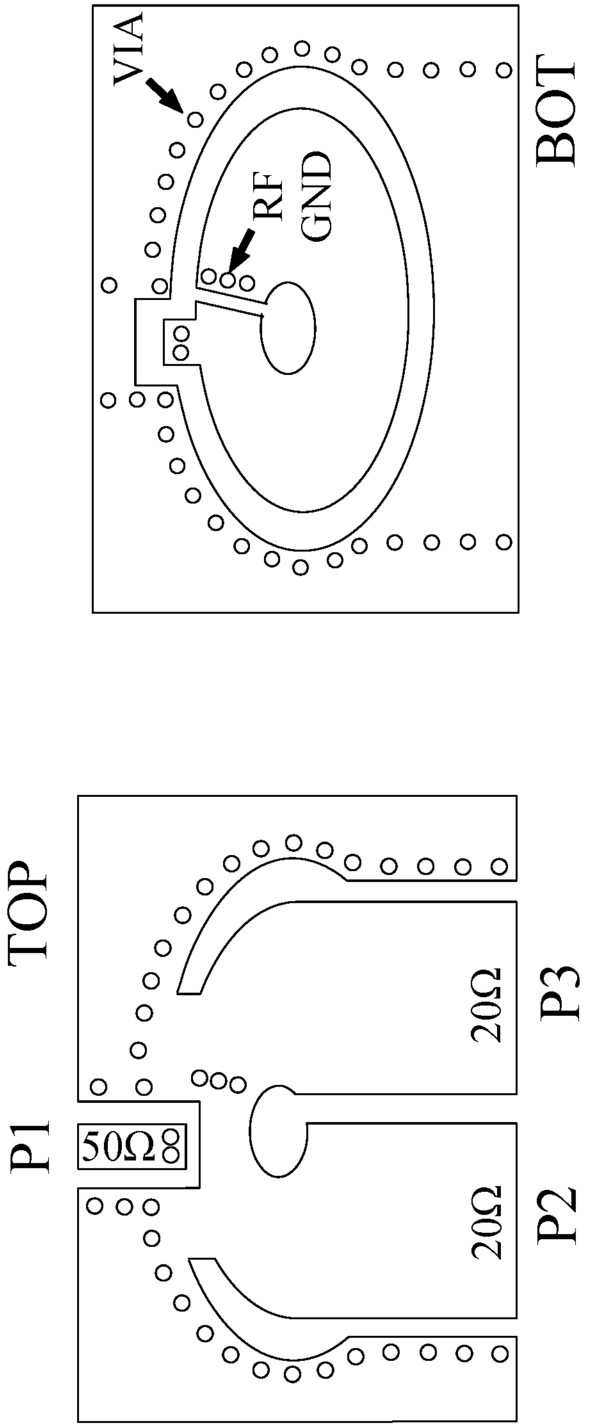
FIG. 6 is a schematic view illustrating a 91 MHz planar Balun applied to a power amplifier implemented by implementing another embodiment of the planar Balun in FIG. 5.

FIG. 6 is a schematic view illustrating a 915 MHz planar Balun applied to a power amplifier implemented by another embodiment of the planar Balun shown in FIG. 5.

As shown in FIG. 6, the planar Balun 3 is electromagnetically coupled by an up-and-down arrangement comprising the first metal 31 of the BOT and the second metal 32 of the TOP to generate a balanced signal, and the push-pull operation of the power amplifier is realized by the balanced signal. The planar Balun 3 can be, for example, a microstrip Balun.

P1 (port 1) is an unbalanced terminal, and P2 (port 2) and P3 (port 3) are two output ports of a balanced terminal.

The planar Balun 3, for example, can convert a 50-ohm input signal near 915 MHz into a 40-ohm differential signal (each single output end 20 ohms). The substrate selected for the planar Balun 3 is RT/duroid 6035HTC, which has a high thermal conductivity of 1.44 W/m·K and an extremely low loss tangent; low tangent loss can reduce the energy lost in the material, while high thermal conductivity can quickly dissipate heat, avoiding material collapse caused by temperature rise or increasing tangent loss.

Figure 7:
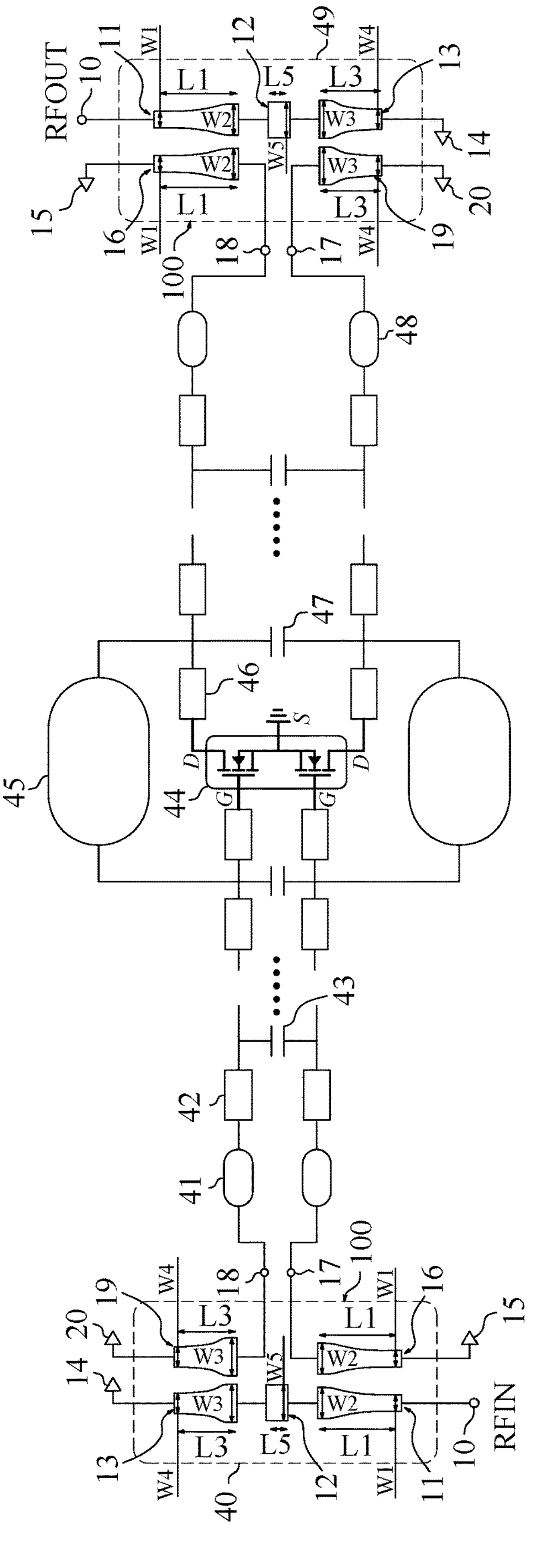
FIG. 7 is a circuit diagram illustrating the structure and operation of an embodiment of a planar Balun and a power amplifier using the planar Balun of the present invention.

FIG. 7 is a circuit diagram illustrating the structure and operation of an embodiment of a planar Balun and a power amplifier using the planar Balun of the present invention.

As shown in FIG. 7, two planar Baluns 40 and 49 are planar Baluns of the present invention, respectively placed at the input and output ends of the power amplifier, and distributed in a rotationally symmetrical manner. Transistor 44 is two common-sourced transistors. DC blockers 41, 48 are respectively placed behind the planar Balun balance interface. Squares 42, 46, etc. are microstrip transmission lines, while squares 43, 47, etc. are radio frequency capacitors. Between the DC blocker 41 and the gate of the transistor 44, a plurality of microstrip transmission lines 42 and radio frequency capacitors 43 are alternately connected to form a power amplifier input matching network. Between the DC blocker 48 and the drain of the transistor 44, a plurality of microstrip transmission lines 46 and the radio frequency capacitor 47 alternately connected to form a power amplifier output matching network. The total length of the transmission line in the input and output matching network must be less than ½ wavelength. DC supply circuit 45 provides voltage and energy for the gate and drain of the transistor 44. The planar Balun can be, for example, a microstrip Balun.

Figure 8:
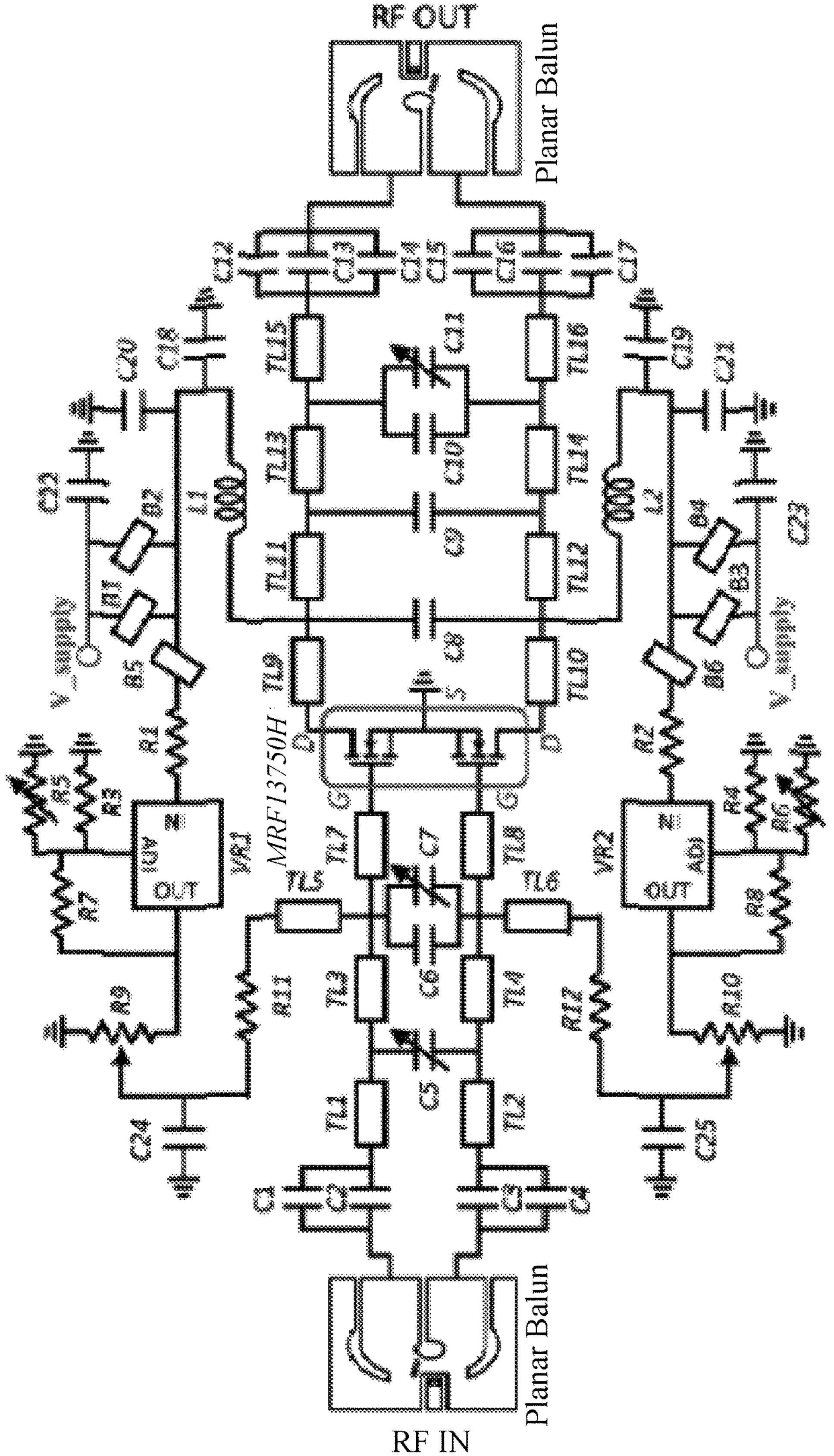
FIG. 8 is a circuit diagram illustrating the structure and operation of another embodiment of a planar Balun and a power amplifier using the planar Balun of the present invention.

FIG. 8 is a circuit diagram illustrating the structure and operation of another embodiment of a planar Balun and a power amplifier using the planar Balun of the present invention. The planar Balun may, for example, be a microstrip Balun.

As shown in FIG. 8, the power amplifier comprises a transistor, an input matching circuit, an output matching circuit, and a bias circuit. The input signal enters the amplifier from the left side, and after being converted by the planar Balun, the 50-ohm impedance is converted into two single-ended impedances of about 20 ohm, and enters separately the TL1-8, C1-C4, and C5-C7 of the input impedance matching circuit labelled MRF13750H, and finally converted into a very low impedance signal to enter the gates of the upper and lower transistors. After being amplified by the transistors, the RF signal flows out from the drain terminals of the two transistors, and enters the TL9-16, C8-11, and C12-C17 of the output impedance matching circuit respectively. At this point, the amplified signal is converted from the original extremely low impedance to close to 20 ohms.

Then, the two signals enter the planar Balun for power synthesis, and are finally converted into 50-ohm output signals, and leaving the power amplifier. For the transistor to work properly, 50 V and about 2.1V must be supplied to the drain and gate. After the 50V DC voltage enters the power amplifier output from top to bottom, one part of the voltage goes through the B1-4, C18-23 of the filter and bypass circuit and enters the drains of the upper and lower transistors; the other part of the voltage goes to the input R1, R2. After going through the voltage stabilizing circuit, VR1-2, R3-12, and C24-25, the voltage is supplied to the gates of the upper and lower transistors. In order to prevent the DC component from flowing to the input and output terminals of the power amplifier, DC isolation capacitors C1-C4, C12-C17 are placed at the balanced end of the Balun. In order to prevent the RF signal from flowing into the bias circuit, the discharge inductors L1 and L2 act as high-impedance barriers before entering the drain. In order to improve the efficiency of the amplifier, the transistors operate in class AB state, and the drain DC bias voltage of the two transistors is set to 150 mA.

FIG. 9 is a table showing the optional component specifications of the embodiment illustrated in FIG. 8 during actual implementation.

Figure 10:
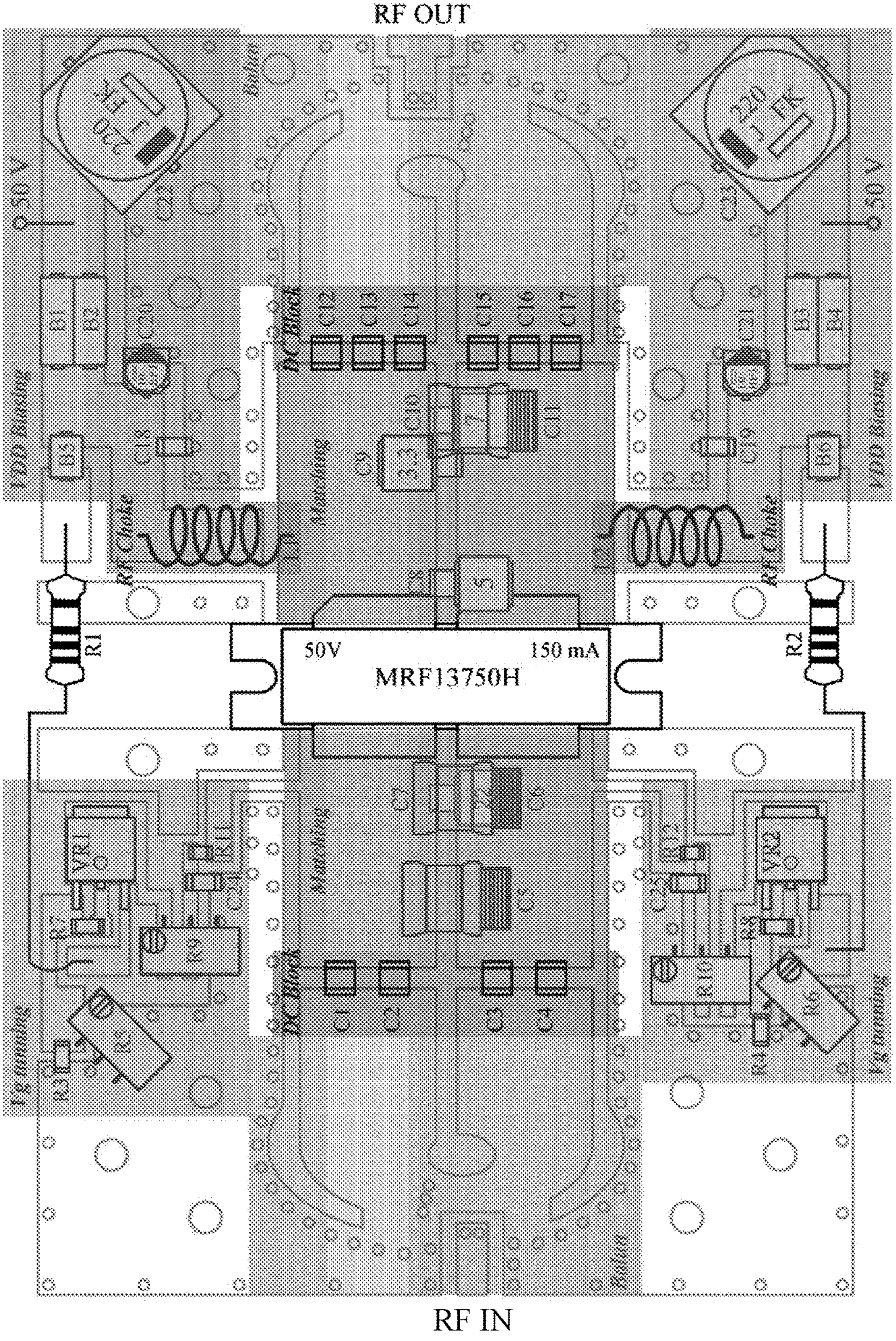
FIG. 10 is a circuit diagram illustrating the arrangement of lumped components of the 915 MHz push-pull power amplifier when the embodiment illustrated in FIG. 8 and the component specifications in FIG. 9 are implemented.

FIG. 10 is a circuit diagram illustrating the embodiment in FIG. 8 and the component specifications in FIG. 9 in actual implementation, and the placement positions of the lumped components of the 915 MHz push-pull power amplifier.

As shown in FIG. 9, for the embodiment in FIG. 8, during actual implementation, the selected component specifications have the required impedance matching results after the layout diagram, and are adjusted and optimized in the high-power test. For power and efficiency, the matching capacitor values can be found, as listed in FIG. 9. FIG. 9 also lists the components used in the power amplifier bias circuit. The placement position of each lumped component of the power amplifier is shown in FIG. 10.

Figure 11:
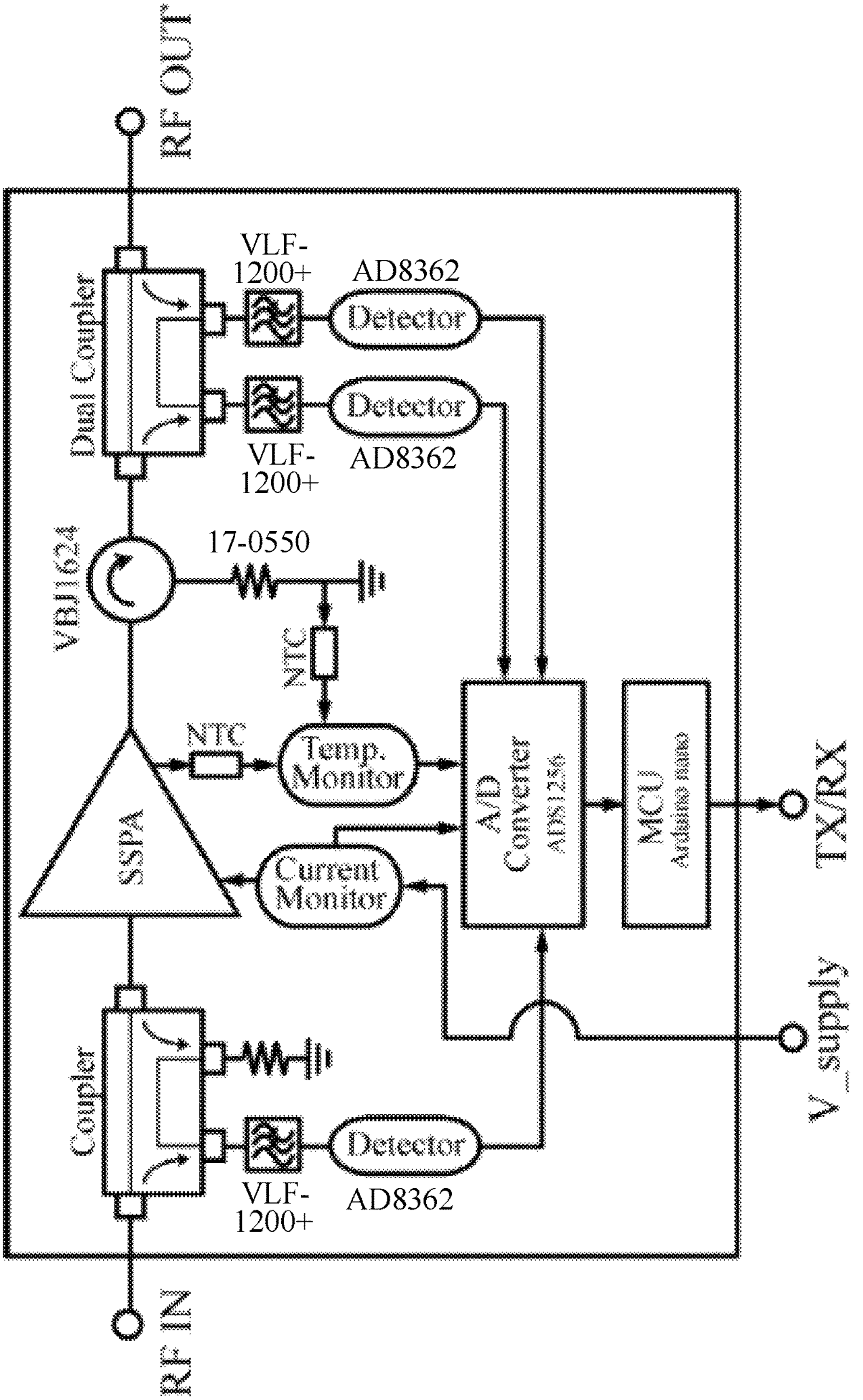
FIG. 11 is a circuit diagram illustrating a push-pull power amplifier module applying the planar Balun of the present invention and a power amplifier using the planar Balun.

FIG. 11 is a circuit diagram illustrating the push-pull power amplifier module of the planar Balun and the power amplifier using the planar Balun of the present invention.

As shown in FIG. 11, the push-pull power amplifier module includes two sets of couplers, a solid-state power amplifier, an A/D converter, a circulator, a temperature detector, a current detector, and a microcontroller (MCU).

Figure 12:
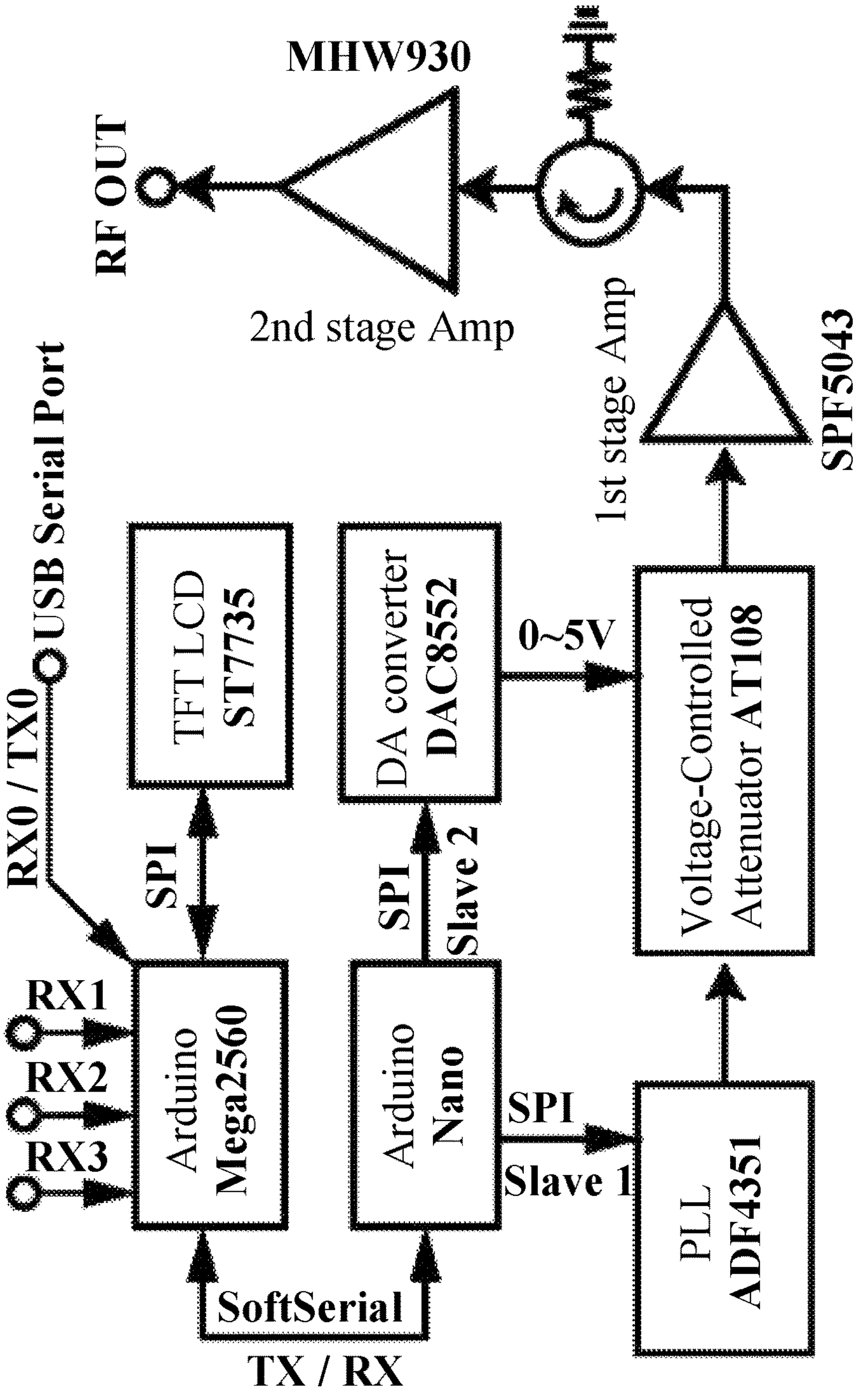
FIG. 12 is a circuit diagram illustrating a planar Balun of the present invention and a radio frequency generator of a power amplifier using the planar Balun.

FIG. 12 is a circuit diagram illustrating a planar Balun of the present invention and a radio frequency source generator of a power amplifier using the planar Balun.

As shown in FIG. 12, the radio frequency source generator module includes a two-stage amplifier, a voltage controlled attenuator, a phase locked loop (PLL), a D/A converter, a plurality of microcontrollers (MCU).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A planar Balun, applicable to an environment of solid-state microwave generator and radio frequency component manufacturing, comprising:

an upper coupling line;

a lower coupling line; and an uncoupled delay line segment;

wherein, the upper coupling line comprises two coupling line segments, and the two coupling line segments are connected in series by the uncoupled delay line segment, and lengths and widths of the two coupling line segments included in the upper coupling line are unequal to each other; and wherein, the upper coupling line and the lower coupling line are electromagnetically coupled in an up-and-down arrangement to generate a balanced signal, and the balanced signal realizes push-pull operation of a power amplifier.

2. The planar Baluns according to claim 1, wherein lengths and widths of two coupling line segments included in the lower coupling line are unequal to each other.

3. The planar Baluns according to claim 1, wherein the widths of the two coupling line segments included in the upper coupled line gradually become larger or smaller, and widths of two coupling line segments included in the lower coupling line gradually become larger or smaller.

4. A planar Balun, applicable to an environment of solid-state microwave generator and radio frequency component manufacturing, comprising:

an upper coupling line;

a lower coupling line; and a delay line segment;

wherein, the upper coupling line comprises two coupling line segments, and lengths and widths of the two coupling line segments included in the upper coupling line are unequal to each other; the lower coupling line comprises two coupling line segments, and lengths and widths of the two coupling line segments included in the lower coupling line are unequal to each other; and the two coupling line segments included in the lower coupling line have gradual impedance changing characteristic and are connected by the delay line segment.

5. The planar Baluns according to claim 4, wherein the widths of the two coupling line segments included in the upper coupling line are gradually increasing or decreasing, and the widths of the two coupling line segments included in the lower coupling line are gradually increasing or decreasing.

6. The planar Baluns according to claim 4, wherein a first end of each of the two coupling line segments included in the upper coupling line is connected to a common radio frequency ground through a via hole; and a second end of each of the two coupling line segments included in the upper coupling line is connected to a balanced output terminal.

7. The planar Baluns according to claim 6, wherein one end of a metal segment formed by connecting the two coupling line segments of the lower coupling line with the delay line segment is connected to the common radio frequency ground through a via hole, and the other end is connected to an unbalanced input.

* * * * *